Aug. 13, 1968     R. W. HOEPPEL     3,397,347
MAGNETIC DISPLACEMENT TRANSDUCER
Filed May 16, 1966     2 Sheets-Sheet 1
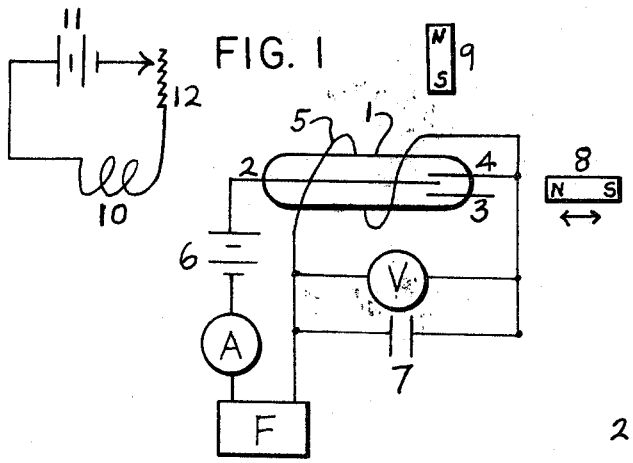
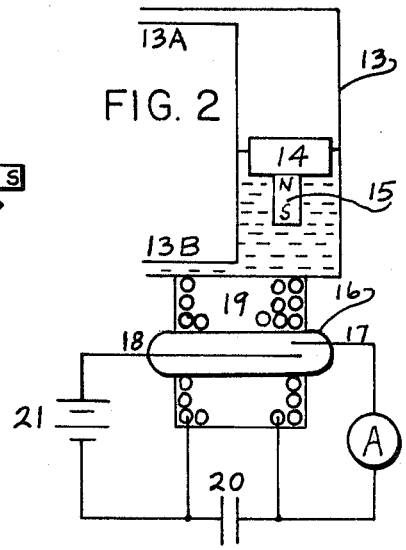
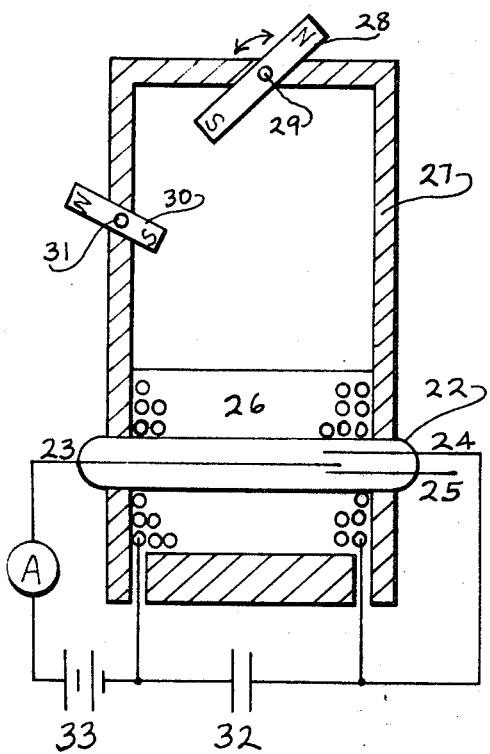
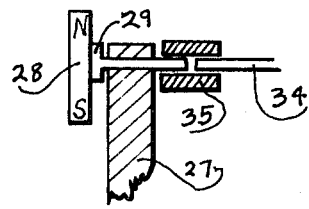
Raymond W. Hoeppel
INVENTOR.

FIG. 5
FIG. 6
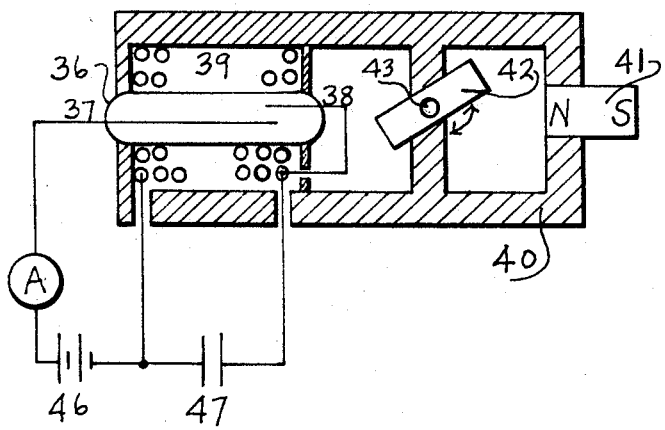
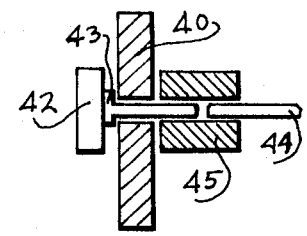
Raymond W. Hoeppel
INVENTOR.

United States Patent Office 3,397,347
Patented Aug. 13, 1968

3,397,347
MAGNETIC DISPLACEMENT TRANSDUCER
Raymond W. Hoeppel, P.O. Box 5,
Oak View, Calif. 93022
Continuation-in-part of application Ser. No. 219,602,
Aug. 27, 1962. This application May 16, 1966, Ser.
No. 550,370
11 Claims. (Cl. 317—123)

ABSTRACT OF THE DISCLOSURE

A displacement transducer for measuring movement of a nearby member comprises a magnetically biased vibrating reed relay having a capacitor to retard its vibration rate and ferromagnetic material attached to the moving member that alters the magnetic bias flux at the relay. The degree of movement is indicated by a transducer that is switched by the vibrating contacts of the relay, the vibration rate varying with the movement of the member.

---

This is a continuation-in-part of U.S. Patent No. 3,252,057 filed Aug. 27, 1962.

This invention relates to a displacement transducer and more particularly to a magnetically operated device for the measurement of linear or rotary displacements.

An object of this invention is to provide a simple, inexpensive device for the measurement of either a linear or rotary displacement.

Another object of this invention is to enable the measurement of displacements occurring at a distant point and to enable telemetering of such data over a considerable distance.

Another object is to provide a displacement transducer that can be separated from the moving member by a considerable air gap, which exerts very little restrictive force on the moving member, and which may be used for measuring displacement within sealed chambers.

The objects of this invention are accomplished by utilizing a novel type of vibrating reed switch to indicate, by either a change in frequency or a change in power dissipation, the relative movement of a source of constant magnetic flux with respect to the switch, the flux source being mechanically coupled to the moving member to be measured. In another embodiment the flux source is held stationary and the moving member is coupled to move a flux diverting mass.

In the accompanying drawing, FIGURE 1 shows the circuitry of the novel vibrating reed switch, showing three sources of magnetic flux, any one of which may be used for controlling the vibration of the switch, and showing three readout devices, any one of which may be used for measuring the degree of displacement.

In FIGURE 2 is shown in cross section a device for measuring the depth of water in a sealed container utilizing essential components shown in FIGURE 1.

FIGURES 3 and 5 show devices in cross section for the measurement of rotary motion, and FIGURES 4 and 6 show side views in cross section of these devices, showing the means for coupling the rotary portion of the devices to an external rotating member.

To better understand the operation of the displacement transducer the vibrating magnetic reed switch shown in FIGURE 1 must be studied. This switch is fully described in U.S. Patent No. 3,252,057. In FIGURE 1 is shown a conventional double throw magnetic reed switch, 1, housed within solenoid 5. The switch comprises two normally open contacts, 2 and 3 and two normally closed contacts, 2 and 4. In the presence of a magnetic field, contacts 2 and 3 close and contacts 2 and 4 open.

In the circuit shown in FIGURE 1, the normally closed contacts are connected in series with solenoid 5, battery 6, ammeter A and a frequency meter, F. An essential component of the vibrating switch system is capacitor 7, which normally is shunted across solenoid 5. A voltmeter may also be shunted across solenoid 5 to indicate the voltage across the solenoid. In operation, when the battery circuit is completed, current flowing through the solenoid sets up a magnetic field causing contacts 2 and 4 to open, whereupon current ceases to flow through the solenoid, the magnetic field collapses and the contacts again close, thus re-starting the cycle and thus setting the reeds in vibration which continues as long as current flows. Capacitor 7 reduces the vibrating rate of the reeds and stabilizes the vibration. The rate of vibration may be read directly on the frequency meter or indirectly by reading either the ammeter or the voltmeter. As the rate of vibration increases, the reading of the ammeter or the voltmeter increases proportionately and these readings are quite insensitive to appreciable fluctuations in the voltage of the power supply.

If, while vibrating, switch 1 is approached by a constant source of magnetic flux, such as permanent magnet 8, its rate of vibration will either be increased or decreased depending upon the polarity of magnetism induced by magnet 8 into the ferromagnetic reeds of the switch, and this in turn is related to the magnetic pole nearest the switch. The rate of vibration will vary with the distance between the switch, 1, and magnet 8, and thus this distance may be measured by reading frequency meter, F, ammeter A or voltmeter V. Since normally open contacts, 2 and 3, also operate intermittantly when the switch is in vibration, these contacts also can be used to measure the frequency of vibration by connecting them in series with a power source and a frequency meter or an ammeter.

The operating air gap between magnet 8 and the switch, 1, will vary with the strength of the magnet, the larger magnets operating over a greater air gap. If it is desired to increase this air gap without increasing the size of the magnet, a second source of constant magnetic bias, such as a second magnet, 9, may be used to reinforce the field of magnet 8 at the switch and bias the switch, thus allowing magnet 8 to operate at a greater distance from the switch. When this is done, then the rate of change of frequency of the switch is less for a given amount of movement of magnet 8 than when magnet 8 operates closer to the switch; this is in view of the inverse square law. Thus the use of a second flux source to bias the switch enables measurement of a greater degree of displacement for a given size movable magnet. Or magnet 9 may counteract the field of magnet 8, thus enabling magnet 8 to operate closer to the switch.

Other sources of magnetic bias may be used, such as solenoid 10 carrying current from battery 11, which is in turn regulated by variable resistor 12. It is, of course, obvious that all of these external sources of constant magnetic flux must be in flux coupling relationship with the switch in order to be effective. All flux sources used as magnetic bias should be located in a fixed position with respect to the switch, but it is often desirable to have the bias flux manually adjustable, such as by means of resistor 12, or by making the position of a bias magnet with respect to the switch manually adjustable, as shown in FIGURE 3.

In another embodiment, the normally open contacts of a magnetic reed switch may be used to switch the current through the solenoid, such as is shown in FIGURE 2 or FIGURE 3. In this instance it is necessary to bias the normally open switch contacts to a closed position by an external source of constant magnetic bias before vibration will begin. It is, of course, possible for the moving source of constant magnetic flux, such as magnet 8, (FIGURE 1) or magnet 28 (FIGURE 3) to act as a bias source to close the normally open contacts, and then any further movement of these magnets will produce the operating flux to vary the frequency of vibration of the switch. The polarity of the bias field at the switch must oppose that of the solenoid at the switch where the normally open contacts perform the solenoid switching action.

It is desirable, but not necessary, that the vibrating switch be located within the solenoid. It is only necessary that the solenoid be in flux coupling relationship with the switch. Also, bias solenoid 10, which is shown remotely located in FIGURE 1, may be wound concentric with solenoid 5, and in fact solenoid 5 itself may be used as both an operating solenoid and as a bias producing solenoid, the current for producing the bias being connected directly to the solenoid and not passing through contacts 2 and 4.

In FIGURE 2 is shown a linear displacement transducer employing a normally open magnetic reed switch, the transducer being used for measuring the level of liquid in a sealed chamber 13. Chamber 13 can be conencted to a closed vessel, or even a pressure vessel via outlets 13A and 13B. Chamber 13 should be constructed of non-ferromagnetic material. A permanent magnet, 15, is attached to float 14 which floats on the surface of the liquid in the container. Attached to the container is a vibrating switch system comprising magnetic reed switch 16 housed within solenoid 19, which in turn is connected in series with power source 21, normally open contacts, 17 and 18, and ammeter A. The solenoid is shunted by capacitor 20.

At some given level of liquid in the vessel, 13, the flux produced by magnet 15 at switch 16 will be sufficient to close contacts 17 and 18 and start vibration in the switch. At this point, the reading of the ammeter A will be low. As the liquid level falls, magnet 15 approaches closer to the switch thus increasing the magnetic field at the switch and increasing the rate of vibration of the switch, which in turn causes more current to flow through the ammeter. Thus the reading of the ammeter will increase proportionately as the liquid level falls in the vessel. The level also may be measured by measuring the frequency of vibration of the switch or by measuring the voltage across the solenoid as was previously described. Any of these readout devices may be located at a considerable distance from the float chamber and only a two wire transmitting conductor need be used to communicate this data. Since this is a low impedance system the wires need not be shielded.

In FIGURE 3 is shown a rotary displacement transducer utilizing the vibrating switch of FIGURE 1 as the sensing element. Here magnetic reed switch 22 is housed within solenoid 26 which in turn is fastened to a non-ferromagnetic framework, 27. At the top of this framework is mounted permanent magnet 28 which in turn is fastened to shaft 29 which can be rotated in the directions shown by the arrows. Also, attached to this framework is permanent magnet 30 which can be rotated about pivot 31 with sufficient friction between the pivot and the magnet that the magnet will stay in any position in which it is manually oriented. This magnet, 30, is used to bias the magnetic reed switch, 22, to a closed operating position. In FIGURE 4 is shown how magnet 28 and its attached shaft 29 is attached to a moving member, 34, by means of coupling 35. Thus any rotating movement of member 34 is communicated directly to magnet 28 to cause a corresponding rotary motion.

The position sensor operates in a manner similar to that of FIGURE 1 except that the normally open contacts, 23 and 24, instead of the normally closed contacts, are connected in series with the solenoid, 26, power source 33 and ammeter A to control the current through the solenoid. Capacitor 32 shunts the solenoid. After biasing the contacts 23 and 24 to a closed condition by rotating magnet 30, the switch is set in vibration and the period of vibration will then vary with the rotary movement of magnet 28 as it is in turn moved by rotating member 34. As before, the reading of the ammeter correlates with the period of vibration and hence this reading correlates with the position of the rotating shaft 34. It is obvious that biasing magnet 30 is not necessarily required inasmuch as the operating magnet, 28, can serve to provide the necessary bias to close the contacts 23 and 24. However, bias magnet 30 does enable the operating range of operating magnet 28 to be shifted to different positions. Here again movement may be measured by means of a frequency meter or a voltmeter as well as with the ammeter shown.

Another embodiment of the displacement transducer is shown in FIGURES 5 and 6. Here, a magnetic reed switch, 36, is housed within a solenoid, 39, which in turn is fastened to a non-ferromagnetic framework, 40. At the other end of this framework is attached a permanent magnet, 41, and between the magnet and the switch is rotatingly mounted, by means of axle 43, a ferromagnetic member which may be either of soft iron or can be a permanent magnet. A side view (FIGURE 6) shows how an external moving member, 44, is attached to axle 43 by means of coupling 45 so that when the external member whose displacement is to be measured is moved, ferromagnetic member 42 likewise moves.

The contacts, 37 and 38, of the switch are connected in series with a power source, 46, and an ammeter, A, as shown heretofore, with capacitor 47 shunted across the solenoid. Then when member 44 moves, the ferromagnetic member 42 also moves, thus distorting the field of magnet 41 and either directing it toward the switch or diverting it from the switch. This variation in magnetic flux at the switch causes a variation in vibration rate which is in turn measured by a change in current flow through the ammeter.

It will be realized that the movable ferromagnetic member can be located in any position with respect to the source of permanent magnetic flux, the magnet in this instance, as long as it will vary the projected flux of the flux source at the switch. Thus the movable ferromagnetic member could operate beside the magnet or even on the side of the magnet projecting away from the switch. Also the ferromagnetic member could operate in a linear movement beside the magnet and distort the projected field of the magnet at the switch.

The vibrating switch displacement transducer, in any of the embodiments shown, can also be used to control other types of electromechanical devices, such as relays or motors, provided such are sensitive to the frequency of vibration of the current flowing through the vibrating switch, as were the frequency motor, ammeter and voltmeter previously shown. For instance, a conventional frequency-sensitive relay inserted in the circuit of FIGURE 1 in place of the ammeter, A, will perform a switching action when the frequency of vibration of the switch attains a given value. Similarly, a stepper motor that is sensitive to the pulses produced by the vibrating switch, can be controlled by the vibrating switch to produce a rotary motion that is proportional to the frequency of vibration of the switch.

The moving source of constant magnetic flux may move in any direction with respect to the switch as long as it produces a changing flux pattern at the switch. Also the movement of the magnet with respect to the switch need not be linearly proportional to the movement of the moving member to be measured.

Though the invention is described by means of embodiments as shown in the drawings, yet various modifications can, of course, be made without departing from the scope of the following claims.

What is claimed is:

1. A displacement transducer comprising in combination a vibrating magnetic reed switch assembly, said assembly comprising in combination a solenoid, a magnetic reed switch in flux coupling relationship with said solenoid, said switch comprising at least two ferromagnetic reed contacts, said contacts being responsive to a magnetic field, said switch controlling a current through said solenoid, means to connect a power source with said switch and solenoid, and capacitive means connected in circuit with said switch and solenoid to stabilize the vibration of said switch; a source of constant magnetic flux in flux coupling relationship with said switch, said source being movable with respect to said switch; means to mechanically couple said source of flux to an external movable member so that said source of flux moves when said external member moves; and electromechanical means connected in circuit with said switch for translating the frequency of vibration of said switch into a mechanical action, the amount of such mechanical action correlating with the relative position of said external member with respect to said switch.

2. A displacement transducer according to claim 1 wherein said switch comprises two normally open and two normally closed reed contacts, said normally open contacts closing and said normally closed contacts opening in the presence of a magnetic field.

3. A displacement transducer according to claim 2 wherein the current through said solenoid is controlled by normally open contacts.

4. A displacement transducer according to claim 2 wherein the current through said solenoid is controlled by said normally closed contacts.

5. A displacement transducer according to claim 1 including at least one source of constant magnetic bias in flux coupling relationship with said switch, said source of bias being located in a fixed position with respect to said switch.

6. A displacement transducer according to claim 5 wherein said source of constant magnetic bias comprises at least one permanent magnet.

7. A displacement transducer according to claim 6 wherein said permanent magnet is manually movable.

8. A displacement transducer according to claim 5 wherein said source of constant magnetic bias comprises a bias solenoid carrying a constant current.

9. A displacement transducer according to claim 8 including means to manually adjust said bias solenoid.

10. A displacement transducer according to claim 1 wherein said constant source of magnetic flux comprises a permanent magnet.

11. A displacement transducer comprising in combination: a vibrating switch assembly, said assembly comprising in combination a solenoid, a magnetic reed switch in flux coupling relationship with said solenoid, said switch comprising at least two ferromagnetic reed contacts, said contacts being responsive to a magnetic field, said switch controlling a current through said solenoid, means to connect a power source with said switch and solenoid, and capacitive means connected in circuit with said switch and solenoid to stabilize the vibration of said switch; a source of constant magnetic flux in flux coupling relationship with said switch and located in a fixed position with respect to said switch; a movable ferromagnetic member operating within the flux pattern of said source of magnetic flux; means to mechanically couple said ferromagnetic member with an external moving member so that said ferromagnetic member moves when said external member moves; and electromechanical means connected in circuit with said switch for translating the frequency of vibration of said switch into a mechanical motion, the amount of said motion correlating with the relative position of said external member with respect to said source of flux and with respect to said switch.

References Cited
UNITED STATES PATENTS

| | | | |
|---|---|---|---|
| 2,073,913 | 3/1937 | Wigan | 335— 87 X |
| 2,550,605 | 4/1951 | Schenck | 335—87 X |
| 3,227,838 | 1/1966 | Hoeppel | 335—153 |
| 3,251,961 | 5/1966 | Wintriss | 335—151 X |
| 3,264,423 | 8/1966 | Mejean et al. | 335—153 |

LEE T. HIX, *Primary Examiner.*

J. A. SILVERMAN, *Assistant Examiner.*